United States Patent

Burnett et al.

[11] Patent Number: 6,006,018
[45] Date of Patent: Dec. 21, 1999

[54] DISTRIBUTED FILE SYSTEM TRANSLATOR WITH EXTENDED ATTRIBUTE SUPPORT

[75] Inventors: Rodney Carlton Burnett, Austin; Jean Elvira Pehkonen, Round Rock, both of Tex.

[73] Assignee: International Business Machines Corporation, Armonk, N.Y.

[21] Appl. No.: 08/538,682

[22] Filed: Oct. 3, 1995

[51] Int. Cl.[6] .................................................. G06F 13/00
[52] U.S. Cl. ..................... 395/200.49; 395/200.3; 395/200.31; 395/200.33; 395/200.43; 395/200.46; 395/200.47; 395/200.48; 395/200.56; 395/200.57
[58] Field of Search ........................ 395/800, 200.01, 395/800.01, 200.3, 200.31, 200.33, 200.43, 200.46, 200.47, 200.48, 200.49, 200.56, 200.57; 364/DIG. 1

[56] References Cited

U.S. PATENT DOCUMENTS

| | | | |
|---|---|---|---|
| 4,780,821 | 10/1988 | Crossley | 395/670 |
| 5,007,082 | 4/1991 | Cummins | 380/4 |
| 5,113,519 | 5/1992 | Johnson et al. | 395/600 |
| 5,235,642 | 8/1993 | Wobber et al. | 380/25 |
| 5,333,266 | 7/1994 | Boaz et al. | 395/200 |
| 5,349,643 | 9/1994 | Cox et al. | 380/25 |
| 5,604,490 | 2/1997 | Blakley, III et al. | 340/825.31 |
| 5,617,568 | 4/1997 | Ault et al. | 395/612 |

*Primary Examiner*—Larry D. Donaghue
*Assistant Examiner*—Dzung C. Nguyen
*Attorney, Agent, or Firm*—Jeffrey S. Labaw; David H. Judson

[57] ABSTRACT

A translation gateway for a distributed computing environment including a source computer system and a target computer system, each of which has at least one client, one server and a distributed file system, and wherein the server associated with the source computer system preferably runs on a client of the target computer system. A method for providing authenticated access to files stored in the target distributed file system in response to file requests originating from clients associated with the source distributed file system begins by mapping credentials associated with incoming client requests from the source distributed file system into enhanced credentials containing authentication information associated with an authentication model of the target distributed file system. At least one enhanced credential is then augmented with one or more attributes whose values may be extracted and used in the processing of the filesystem request by the target file system. The source computer system's server then makes file system requests using the enhanced credentials so that each file request appears to the target computer client as if it were made by an authenticated process with equivalent attributes.

21 Claims, 3 Drawing Sheets

DISTRIBUTED FILE SYSTEM TRANSLATOR WITH EXTENDED ATTRIBUTE SUPPORT

TECHNICAL FIELD

The present invention relates generally to a distributed computing environment and more particularly to techniques for providing interoperability of multiple distributed file systems in such an environment.

BACKGROUND OF THE INVENTION

Multiple computers are often interconnected into a local area network (LAN) to enable such computers to exchange information and share resources. A local area network provides a distributed computing environment in which users can access distributed resources and process applications on multiple computers. A known distributed computing environment, called DCE, has been implemented using software available from the Open Systems Foundation (OSF). In a distributed computing environment, a group of machines is typically referred to as a "domain." An OSF DCE domain is called a "cell." A DCE cell can be a complex environment involving hundreds of machines in many locations.

As DCE environments become the enterprise solution of choice, many DCE applications may be utilized to provide distributed services such as data sharing, printing services and database access. OSF DCE includes a distributed file system, called Distributed File Services (DFS), for use in these environments. DFS provides data sharing services by making use of Remote Procedure Calls (RPCs) for data transfer, a Cell Directory Service (CDS) for naming, and a DCE Security Service for authentication services. In addition to its use of DCE services, DFS itself is rich in features. It provides a uniform global filespace which allows all DFS client users to see the same view of the filespace, and it caches filesystem data at the client for improved scalability and performance by reducing network traffic to file servers. DFS also supports advisory file locking. One of the features of DFS is the ability to export the operating system's native filesystem. In the case of the AIX operating system, the native filesystem is the Journaled File System (JFS). In addition, DFS also provides its own physical filesystem, the DCE Local File System (LFS). The DCE LFS provides support for DCE ACLs (Access Control Lists) on files and directories for securing access to data and advanced data management capabilities such as replication and load balancing.

The OSF DCE DFS was derived from an earlier distributed file system commonly known as AFS. Another known distributed file system was developed by Sun Microsystems and is commonly referred to as Network File System (NFS). Although DCE DFS and NFS are both distributed file system products, the two products are very different in their data-sharing models and semantics. NFS relies on a peer to peer model between machines while DFS operates within an autonomous administrative unit, namely the DCE cell. Semantically, NFS is a stateless system implying that the NFS server does not maintain information about the client requests. DFS maintains state on file and directory information in order to provide Unix single-site semantics through the use of an internal token manager. Administration of a DFS environment is centralized whereby a system administrator can complete the majority of filesystem administration from a single system within the cell. Administration of an NFS environment, on the other hand, often involves updating information on each NFS client system in the environment.

Given these differences, it has proven difficult to allow such distributed file systems to coexist or interoperate in one environment. However, there are several scenarios where this may be desirable. To this end, current DCE DFS provides access to the DFS filespace by allowing an NFS server to export the DFS's client's view of the global filespace (which is the Cache Manager's virtual filesystem implementation accessible via a VFS switch) to an NFS client machine. This functionality, however, is limited to allowing unauthenticated access to the DFS global filespace since NFS is unaware of DCE authentication. As a result, NFS-originated DFS requests are treated as anonymous accesses to the DFS filespace.

There remains a need to provide authenticated access to the DCE DFS filespace from NFS or still other distributed file system products to thereby allow these advanced file systems to coexist and interoperate.

BRIEF SUMMARY OF THE INVENTION

It is thus a primary object of the present invention to enable different distributed file systems to coexist and interoperate within a distributed computing environment domain.

It is a more specific object of the invention to provide authenticated access to the filespace of a distributed file system from file requests that originate from another distributed file system.

It is a further object to map authentication information associated with a file request from a first distributed file system into DCE authentication information suitable for issuing an authenticated request into a second distributed file system.

It is a more specific object of the invention to map at least one credential associated with an incoming client file request into a credential containing authentication information associated with a target distributed file system's authentication model, and thereafter using the credential to obtain any additional attributes associated with the incoming client file request. A credential is a data structure defining a user.

A more general object of the invention is to provide a gateway between disparate distributed file systems coupled with the notion of extended attribute support for particular file requests.

A still further object of the invention is to isolate distributed file system client(s) from one or more authentication translators registered with a remote attribute interface such that the file system clients do not need to be rewritten in order to support the translation function. If additional attributes are associated with a particular file request, the remote attribute interface also returns to the file system client appropriate methods to enable the client to obtain those attributes.

According to a preferred embodiment, a distributed computing environment includes a source computer system and a target computer system, each of which has at least one client, one server and a distributed file system. The server associated with the source computer system is preferably running on a client of the target computer system. The invention provides authenticated access to files stored in the target distributed file system (e.g., DFS) in response to file requests originating from clients associated with the source distributed file system (e.g., NFS). This is achieved by first mapping credentials associated with incoming client requests from the source distributed file system into credentials containing authentication information associated with the target distributed file system's authentication model or "paradigm". This is a source-to-target file system authentication translation. The credential containing authentication information associated with the target file system's authentication model is sometimes referred to as an "enhanced" or "mapped" credential. The source computer system's server (running on the target system's client) then makes the file system request to the target client's virtual filesystem via the VFS switch with the enhanced credential so that the request looks to the target client as if it were made by an authenticated process.

In certain cases, the client of the target computer system may specify file path variables which allow a pathname to a file to vary depending on the value of the variables. According to the present invention, such a variable may be considered to be an "attribute" associated with some particular file request. According to the invention, a remote attribute interface isolates one or more target clients from the source-to-target authentication translation and also provides a mechanism for support of these pathname attributes. An application programming interface (API) enables the target client to extract these attributes for source-originated requests which have authentication mappings. The remote attribute interface further enables additional authentication translators to be supported, thus allowing multiple source distributed file systems to interoperate with the target distributed file system, all without rewrite of the target client.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
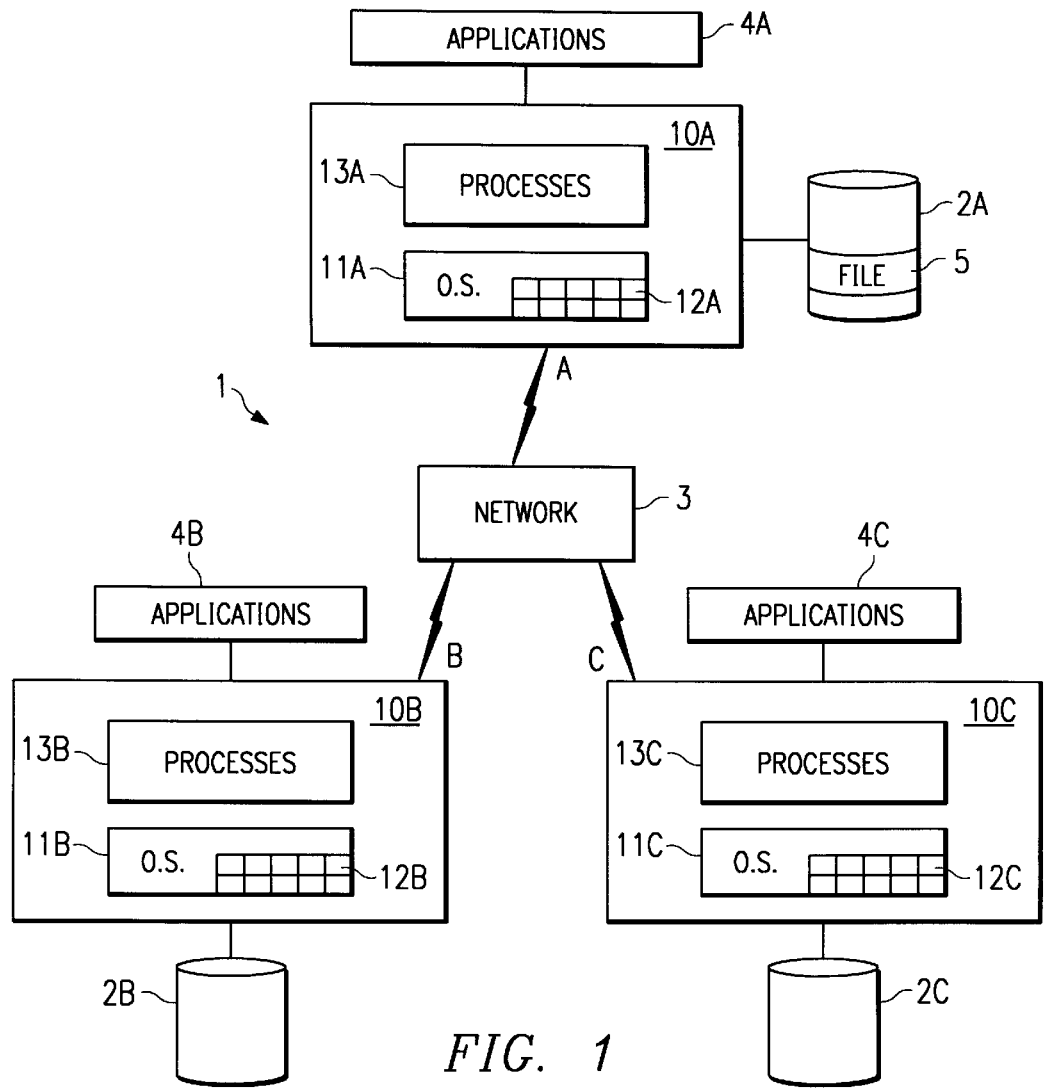
FIG. 1 illustrates a known computer network supporting a distributed file system implementation.

A known distributed computing environment (DCE) is illustrated in FIG. 1 and includes two or more nodes A, B and C connected through a communication link or network 3. The network 3 can be a local area network (LAN) or a wide area network (WAN), the latter comprising a switched or leased teleprocessing (TP) connection to other nodes or to a network of systems operating under a known computer architecture. At any of the nodes A, B or C there may be a processing system 10A, 10B or 10C. Each of these systems may be a single user system or a multi-user system.

Each of the processing systems is a computer, referred to herein sometimes as a "machine.". For example, each computer may be a RISC System/6000® (a reduced instruction set or so-called RISC-based workstation) running the AIX® (Advanced Interactive Executive) operating system. The AIX® operating system is compatible at the application interface level with AT&T's UNIX operating system, version 5.2. The various models of the RISC-based computers are described in many publications of the IBM Corporation, for example, *RISC System/6000, 7073 and 7016 POWERstation and POWERserver Hardware Technical Reference*, Order No. SA23-2644-00. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). Alternatively, each computer may be an IBM® PS/2® running under the OS/2® operating system. For more information on the PS/2 line of computers and the OS/2 operating system, the reader is directed to *Technical Reference Manual Personal Systems/2 Model 50, 60 Systems IBM Corporation*, Part No. 68x2224 Order Number S68X-2224 and *OS/2.0 Technical Library, Programming Guide Volumes 1–3 Version 2.00*, Order Nos. 10G6261, 10G6495 and 10G6494.

In one particular implementation, the invention runs on a plurality of IBM RISC System/6000 machines interconnected by IBM's Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers interconnected by other networks than the Ethernet LAN or IBM's TCP/IP.

Returning now back to FIG. 1, each of the processing systems 10 may operate as a "client" or "server," depending on whether it is requesting or supplying services. Each of these systems may be a single user system or a multi-user system with the ability to use the network 3 to access files located at a remote node in the network. To implement such distributed file services, a local cache 12A, 12B and 12C exists at every node A, B and C. Preferably the local cache is configured on disk or memory and is adapted to retain data and files that are frequently referenced by the resident applications. For example, if file 5 permanently resides at node A on disk 2A, use of the cache 12A by local processes 13A is carried out locally. However, remote processes 13B and 13C executing at nodes B and C, respectively, access file 5 through a two step caching scheme using a server cache and a client cache. The server node gets blocks of file 5 from disk 2A and stores them in the server cache 12A. Client node B goes out over the network and gets blocks of file 5 from the server cache 12A. Client node B stores the blocks of file 5 as it existed in the server cache 12A into the client cache 12B. When the user address space of client B seeks data from any block of file 5, the client cache 12B is accessed instead of going across the network 3 for each access. Using the client cache 12B to access a remote file 5 can significantly improve the performance since it can reduce network traffic and overhead.

Every file input/output (I/O) operation goes through the cache. These operations include read operations, where the application desires to read data from a file somewhere in the network, and write operations, where the application desires to write data to a file somewhere in the network.

Although FIG. 1 shows an environment with just several machines, the invention described below is designed to be implemented in any distributed computing environment domain having any number of machines, and these machines may be located in different geographic locations. For illustrative purposes, the remainder of the detailed discussion is directed to a DCE domain or "cell", although the teachings of the invention are applicable to any distributed computing environment. A representative DCE cell comprises of a set of connected machines, including at least one server and the DCE clients, which share a common cell name and a namespace. Each cell provides a location independent namespace service called CDS, or Cell Directory Service. The naming service is used by application servers to store their location and interfaces, known as server bindings. The cell typically includes one or more server machines, such as Security Servers, Cell Directory Service (CDS) Servers and Time Servers, although most of the machines in the cell are client machines. FIG. 1 thus illustrates a representative DCE cell having the Distributed File System (DFS) service.

Figure 2:
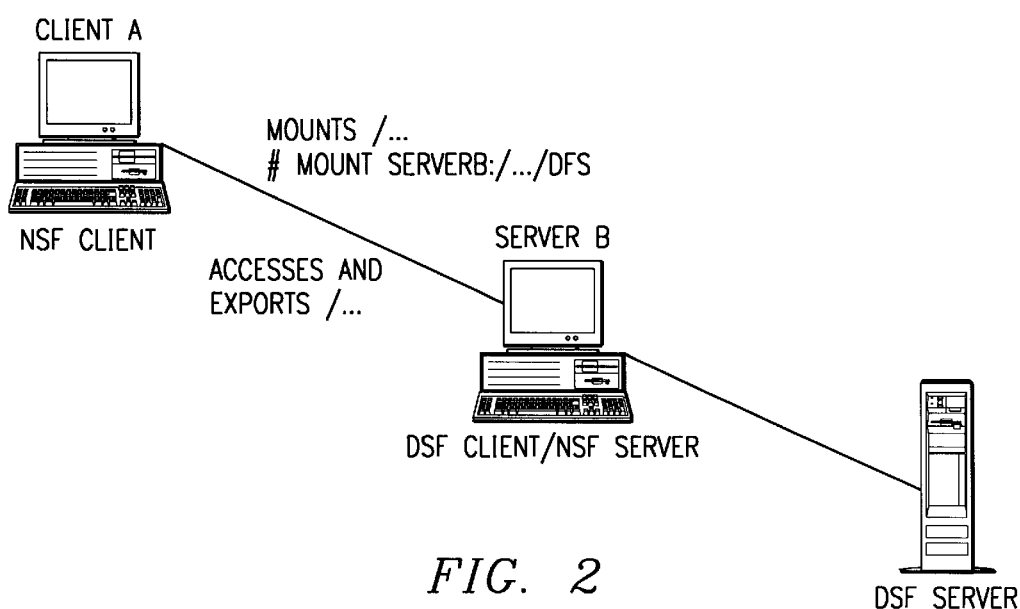
FIG. 2 illustrates a particular distributed computing environment in which the present invention may be implemented.

A known distributed computing environment is also illustrated in FIG. 2 and includes a source computer system and a target computer system. For illustrative purposes, the source computer system is assumed to have a distributed file system associated therewith of the NFS type, and the target computer system is assumed to have a distributed file system of the DFS type. Each of source and target computer systems also includes a number of clients and at least one server.

By way of further brief background with respect to FIG. 2, it is known that DFS uses so-called DCE Kerberos-based authentication. A unix "credential" is associated with each "vnode" operation, which holds the local authentication information for the operation. A credential is a data structure defining a particular user of a multiuser machine (or it may simply describe the machine itself on a non-multiuser system). Typically, from the local operating system's point of view, the credential includes a user id, a group id, a list of operating system privileges and an authentication identifier known as a PAG (Process Authentication Group). The PAG acts as a tag for associating "tickets" between DFS and the DCE security component. PAGs are created and managed by the DFS client. A vnode is a data structure used to describe a file, and there is a vector of procedures associated with each vnode.

Generally, there are no AIX services to create or manage PAGs. Instead, when DFS users (so-called "principals") authenticate via dce_login, the DCE security component interacts with DFS through a setpag( ) interface to establish the PAG/ticket relationship in the process's credential. On filesystem requests, DFS extracts the PAG from the credential structure to establish the DCE principal's authentication for RPC requests to the DFS fileserver.

Also, it is known that the DFS client provides a mechanism for specifying file path variables which allow a pathname to a file to vary depending on the value of the variables. Two such path variables are @sys and @host. The @sys variable typically has a value indicating a hardware/software combination for a platform. For example, the @sys value for DFS on AIX version 3.2 on the RS/6000 is rs_aix32. The @sys variable is commonly used as a switch in filesystem paths to binaries for particular platforms. For example, /:/local/bin may really be a symbolic link to /:/local/@sys/bin. For AIX, the path, after substitution, would be /:/local/rs_aix32/bin. The @host variable is used in the OSF DCE diskless component based on the DFS protocol.

In NFS, it is known that users are described by user-identifiers (uid's), which are coded as integers. These integers represent user accounts on the NFS client of FIG. 2, for example. In a known operation, the NFS server extracts the user-identifier from the authentication portion of the NFS client request and uses it to create a unix credential which will be associated with the vnode operation(s) called to satisfy the NFS request. This credential is sufficient to access locally-mounted filesystems on the server. Thus, in the prior art it has been possible for an NFS client to mount and access DFS although it is not running a DFS client. This scenario, illustrated in FIG. 2, is advantageous in environments where DFS client software is not available for hardware platforms in the enterprise, such as DOS-based PC's. As seen in FIG. 2, the DFS client runs the NFS server software and makes the DFS filespace available for mounting by adding it to the /etc/exports file. An entry such as / . . . allows this. NFS clients in turn mount the filesystem the same way they mount other remote filesystems. The NFS client then has access through the path /dfs. True DFS clients have access to the same information through the path /.:/fs.

In the scenario of FIG. 2, however, NFS clients do not have the ability to be DCE-authenticated and therefore any access they gain to the DFS server will be as un-authenticated users. This is because in the NFS authentication model, the PAG field within a credential is blank. Thus, in certain circumstances (e.g., where there is an Access Control List set to protect the DFS filespace) NFS clients wishing to gain access to the DFS filespace will be denied such access. The present invention allows NFS users authenticated access to DFS so that they may access data with access controls.

Figure 3:
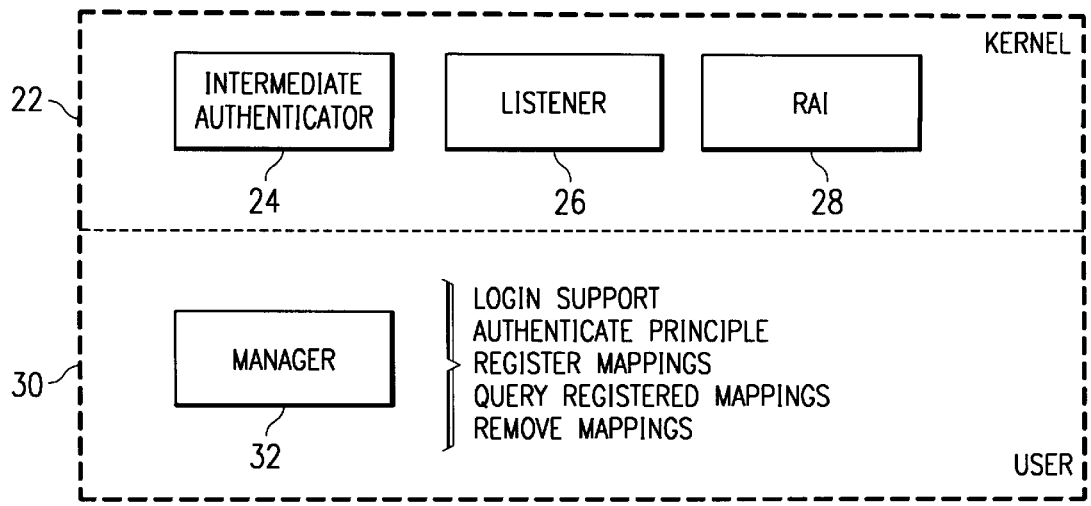
FIG. 3 is a block diagram the basic functional components of the Translator of the present invention.

FIG. 3 shows a simplified block diagram of the Translator 20 of the present invention, which includes a number of functional components: a kernel portion 22 having an intermediate authenticator 24, an NFS listener 26, and a DFS Remote Attribute Interface (RAI) 28, and a user portion 30 having a manager 32 for managing intermediate authentication mappings. Preferably, the user portion 30 is reached by logging into the DFS client machine running the Translator either locally or via remote login facility (telnet, rlogin) to manage the intermediate authentication mappings. The manager 32 performs the following functions—authenticate a DCE principal to be associated with an NFS host/id pair, register NFS/DFS authentication mappings with the Translator, query registered intermediate authentication mappings, and remove intermediate authentication mappings from the translator. In addition, expired mappings are removed from the Translator periodically. As will be discussed below, the command to perform these functions is called dfsiauth.

The intermediate authenticator 24 forms the core of the Translator. It maintains the intermediate authentication mappings between NFS and DFS, transforms incoming NFS credentials into suitable DFS credentials, contains the intermediate authenticator's remote attribute manager for @sys and @host support, and provides system call interfaces to manage the intermediate authentication mappings. This component preferably is implemented as a kernel extension.

The NFS listener 26 (called nfs_listener) is a function added to the NFS server path and which examines and intercepts incoming NFS client requests destined for the DFS client filesystem. If the intermediate authenticator is active, this function is called to examine and possibly transform the NFS credentials to contain authentication information necessary for authenticated DFS access. An external interface is provided by this component for the intermediate authenticator to register its presence.

The last component of the kernel portion 22 is the DFS Remote Attribute Interface 28 (implemented as dfsrai) which provides an interface for the intermediate authenticator to register its remote attribute manager. Remote attribute managers provide operations for extracting @sys and @host information. The Cache Manager uses dfsrai to query these values for requests which did not originate on the DFS client machine. When the Cache Manager (i.e. the DFS client) sees that the request originated from a remote source (i.e. an NFS server), it attempts to obtain a dfsrai handle for the given request. If a handle is returned, then the handle's operations can be called to obtain the @host and @sys values for the request represented by the handle. The dfsrai component is preferably implemented as part of the kernel extension on AIX which holds the DFS Cache Manager function.

As noted above, in order for the filesystem request to be authenticated, the credential must contain a valid PAG which DFS can use to make DCE-authenticated requests to the DFS fileserver. According to the present invention, a NFS request is uniquely identified by the NFS client's Internet Protocol (IP) address and the uid in the request, therefore an association is made to map from the remote IP address and remote user id to a PAG (which is later placed in the otherwise blank PAG field in an NFS server request's credential to create an "enhanced" or mapped credential). This process is sometimes referred to as "intermediate authentication." The Translator acts as an intermediate agent which maps host address/uid pairs for NFS requests to DCE principals via DFS PAGs. It also provides the manager 32 for managing the mappings, and for preparing a NFS server request's credential with the mapped PAG for passage into the DFS client. In that process, the PAG (created from the remote IP address and the remote user id) is placed in the blank PAG field to create the enhanced credential.

Further, given that various NFS client platforms would be expected to access the DFS filespace via the NFS translator, support for the @sys variable is also provided and is used to facilitate transparent access to platform-specific binaries in DFS by NFS clients. To support this, an @sys property is stored along with the PAG in the NFS to DFS mappings of the translator and an API is provided for DFS to extract this property for NFS-originated requests which have mappings. This support adds significant value to the translator and is now described with respect to FIGS. 4–5.

By way of brief background, the DFS Remote Attribute Interface (dfsrai) provides a mechanism in which a resource manager that produces objects can register itself and a set of methods which can be used to extract attributes associated with the object. Consumers of objects can then use dfsrai to locate a reference to the resource manager's methods which allows extraction of the object attributes. The consumer gains access to the resource manager's object methods by presenting the object to the dfsrai. The dfsrai then enumerates through the resource managers which have registered with it presenting the object to each manager. If the object belongs to the resource manager, it indicates so by returning a handle which the dfsrai then returns back to the object consumer. The handle then allows the object consumer to call the resource manager's methods directly to extract the attributes associated with the object.

This model provides a dynamic mechanism in which consumers of objects can obtain attributes on objects without specific knowledge of the resource manager which created the object. The object attributes preferably are not stored in the dfsrai, instead the dfsrai effectively acts as a location broker to allow object consumers to find object producers with only the object as the information link. This allows several resource managers to produce similar objects which may differ in internal content or implementation, but support the same attributes. The object consumer, which is only interested in the attributes, can obtain them without knowing which resource manager is behind the object or what the object looks like internally.

Figure 4:
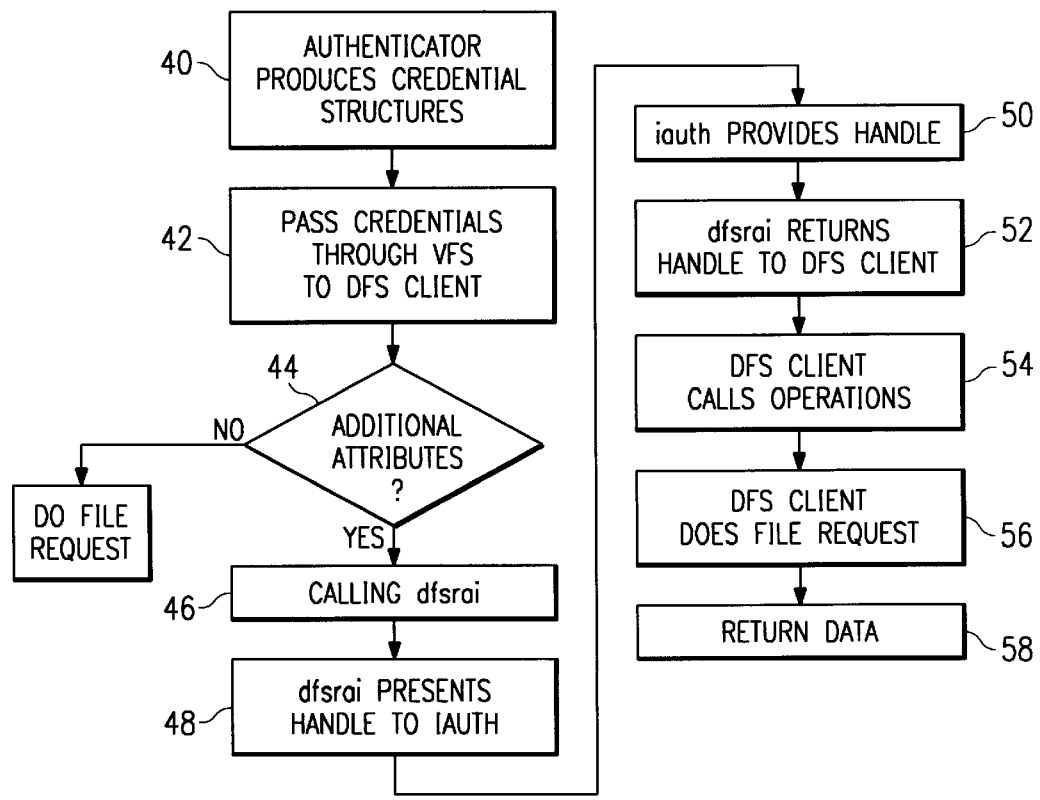
FIG. 4 is a flowchart describing the operation of the remote attribute interface of the invention.

FIG. 4 is a flowchart representing the basic operation of the dfsrai as applied in this invention. As noted above, the intermediate authenticator is the object producer. At step 40, the authenticator responds to NFS server requests and produces credential structures representing authenticated DCE principals. At step 42, the NFS server then passes the generated credentials through the virtual filesystem switch (VFS) to the DFS client (DFS Cache Manager); thus the DFS Cache Manager is the object consumer which uses the credentials. The DFS Cache Manager, in particular, is interested in the @sys and @host attributes associated with a particular credential. Thus, at step 44 a test is performed to determine whether any such attributes exist. If the outcome of the test at step 44 is positive, the method continues at step 46 with the Cache Manager by calling the dfsrai with the credential as input. At step 48, the dfsrai presents the credential to the intermediate authenticator which registered with the dfsrai (and there may be more than one as will discussed below). At step 50, the intermediate authenticator then provides a handle to the dfsrai, and this handle is returned to the DFS Cache Manager by the dfsrai at step 52. At step 54, the DFS Cache Manager then calls the operations identified in the handle to get the @host and @sys values for the provided credential. With the credential and attribute values, the DFS Cache Manager then carries out the file request to the DFS server at step 56. The requested data is returned at step 58.

Use of the remote attribute interface RAI mechanism allows for maximum flexibility and future enhancement of the DFS gateway architecture. By hiding details of the object producer, the modifications to the DFS Cache Manager are minimized since the Cache Manager does not have to understand the internals of the intermediate authenticator implementation. In addition, the RAI mechanism can be used for other gateways to DFS from other file sharing protocols (besides NFS) such as AFS or Novell Netware. A Novell Netware to DFS authenticating gateway allows Novell Netware clients to gain authenticated access to files stored in DFS. In such case, a separate intermediate authenticator is provided which registers with the dfsrai and produces DCE-authenticated credentials from Netware requests. The DFS Cache Manager would then obtain @host and @sys values for the credentials produced by the Netware intermediate authenticator. This enables a new gateway to be implemented without requiring code changes to the DFS Cache Manager.

Figure 5:
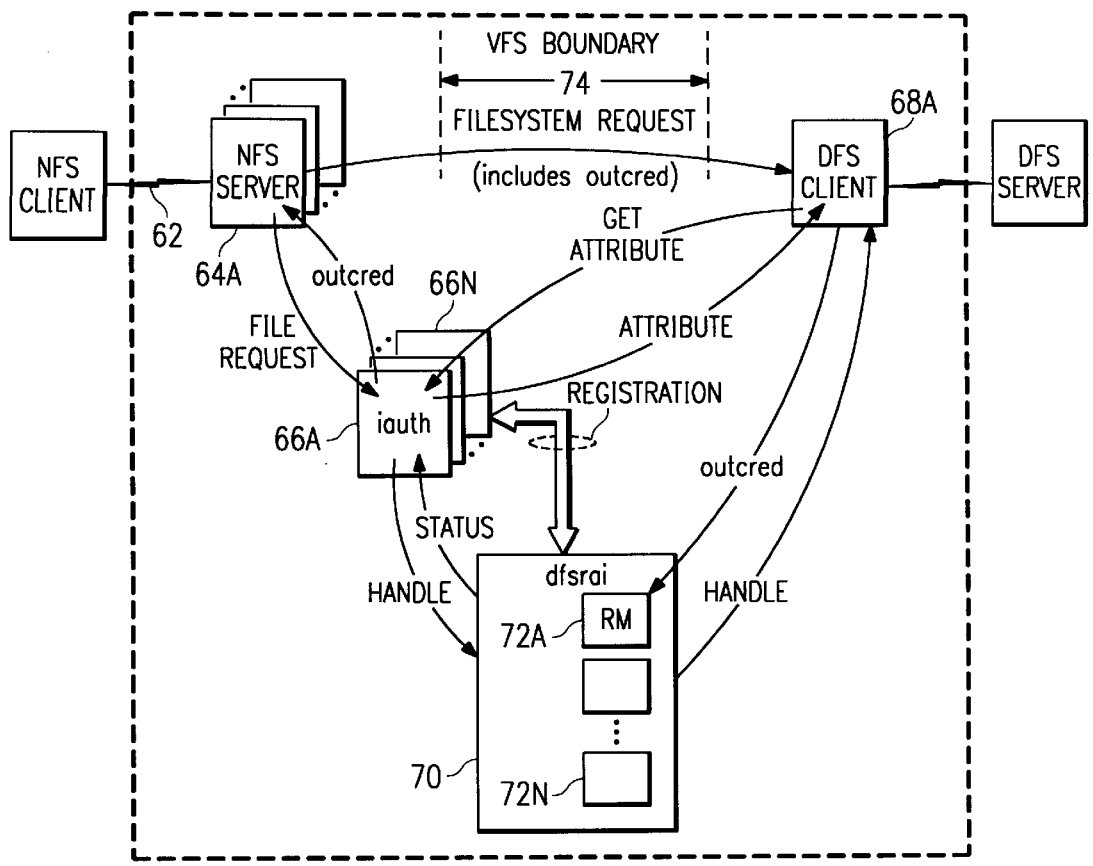
FIG. 5 is a block diagram showing the implementation of multiple intermediate authenticators coupled with the dfsrai to thereby facilitate gateways between multiple source file systems and a target file system.

This approach is illustrated in the block diagram of FIG. 5. In this figure, there is an NFS client which desires to make a file request over the network 62 to a NFS server 64a. NFS server 64a preferably is running on a target computer having associated therewith an intermediate authenticator (iauth) routines 66a–n, a DFS client 68a (also referred to a DFS Cache Manager), and the DFS Remote Attribute Interface (dfsrai) 70. As noted above, dfsrai 70 provides the important function of isolating the DFS clients 68 from the iauth routines 66, and thus, several different iauth routines may be implemented. Thus there may be an iauth routine 66a for the NFS server 64a, another iauth routine 66b for the Netware server 64b, and so on. The dfsrai 70 provides the interface to allow object consumers (namely DFS clients, such as client 68a) to find producers of objects (namely the iauth routines, such as iauth 66a). According to the invention, one or more of the iauth routines have zero to n additional attributes associated with each enhanced credential. In the NFS/DFS embodiment, these additional attributes include @sys and @host, although others may be used. Such additional attributes generally provide system architecture dependent pathnames and thus provide additional information pertaining to the file request. Each iauth routine has a remote manager 72a–n registered with Remote Attribute Interface 70.

Upon receipt of a NFS client file request over the network 62, iauth 66a generates an enhanced credential if a NFS/DFS mapping exists for the NFS client and user id. This enhanced credential (outcred) is passed back to the NFS server 64a which then issues a filesystem request (which includes the outcred) through the VFS boundary 74 to the DFS client 68a. The Cache Manager receives the file request and determines whether additional information pertinent to the request (e.g., the attributes) is desired. If so, the Cache Manager sends the outcred to the dfsrai, which as noted above acts as the broker to remote managers. The dfsrai then queries each remote manager 72 to determine whether the enhanced credential was generated by the associated iauth manager. If the enhanced credential belongs to the queried remote manager, the manager indicates this by returning back to the dfsrai a status and a handle. This handle is then returned from the dfsrai back to the Cache Manager 68a, which uses it to get the attributes. In particular, the Cache Manager issues the appropriate method to iauth to obtain the @sys value, for example. The value is then returned to the Cache Manager and, along with outcred, used to make the file request to the DFS server over the network 75.

Figure 6:
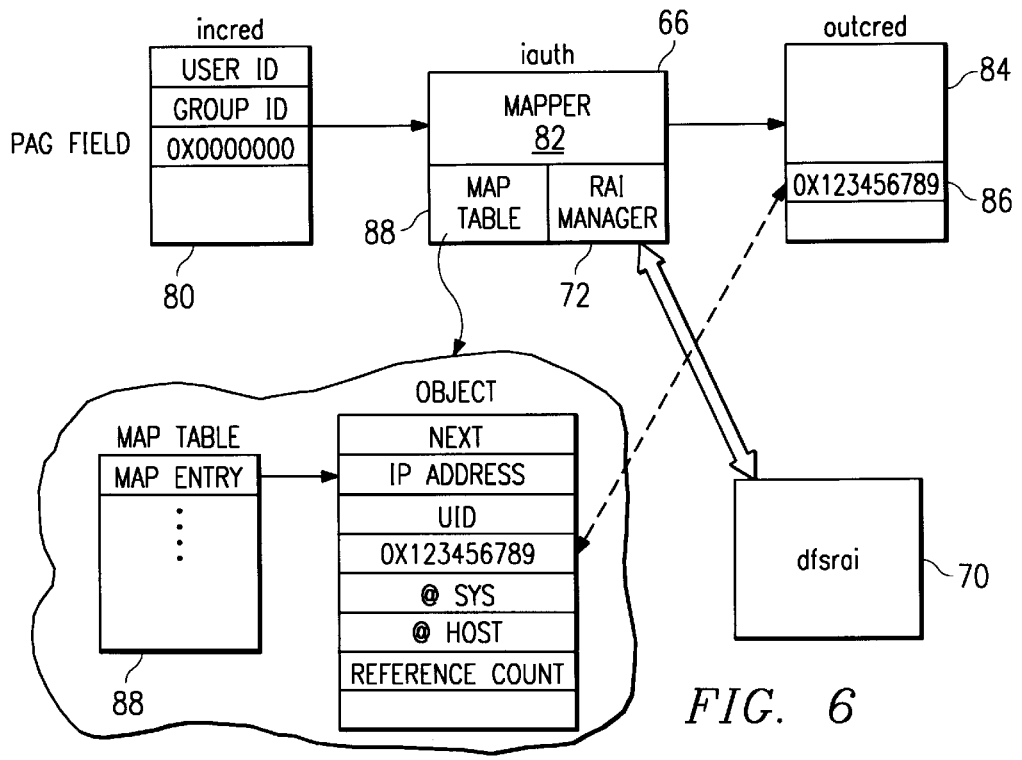
FIG. 6 is a representation of how the system of FIG. 5 maps an NFS credential to an enhanced credential.

Referring now to FIG. 6, a representation is shown of how the system of FIG. 5 creates the enhanced credential. As seen in FIG. 6, the NFS credential (or "incred") 80 received from the NFS client is a data structure having a number of elements: a user identifier, a group identifier, and a PAG field, which is blank. The credential is modified by a mapper function 82 of iauth 66 to create the enhanced or modified credential 84, which includes the PAG 86. The iauth routine 66 supports a map table 88, which is shown in an exploded view. Map table 88 includes a linked list of map entries, one of which is shown. Each map entry is an object having a number of members: a "next" pointer pointing to the next entry in the linked list, the remote IP address, the uid, the unique PAG generated from the remote IP address and uid, the @sys and @host variables, if any, and a reference count that maintains the object's existence until the count reaches a predetermined value. The dotted line between the outcred data structure and the map table reflects that the PAG 86 is used to derive the attributes indirectly from the map table through the operation of the remote attribute manager and dfsrai, as previously described.

A detailed design of the translator and the extended attribute support functionality is set forth below. This implementation is merely exemplary and illustrates the NFS/DFS embodiment, although the basic functionality may be used to enable other gateways between source and target distributed file systems.

1. Kernel Interface Descriptions

The following sections describe the kernel interfaces for the Translator components. These interfaces form the boundaries between the components and are only intended for use by the Translator Components.

1.1 Intermediate Authenticator Interfaces 1.1.1 NFS/DFS Remote Attribute Manager These operations provide the support for maintaining the @sys and @host properties stored along with the authentication mappings. The Intermediate Authenticator registers its manager via the DFS Remote Attribute Interface (dfsrai_registero( )). These operations are called via the table of function pointers in the dfsrai handle structure. The DFS Cache Manager is the caller of these functions.

1.1.1.1 nfsdfsCredToRef

Purpose

Find a remote attribute interface handle for a cred structure

Syntax int nfsdfsCredToRef(struct dfsrai_handle *hint, struct ucred *cred, struct dfsrai_handle **ref)

Parameters

| | |
|---|---|
| hint | A hint of which dfsrai handle the cred maps to |
| cred | credential structure to find a handle for |
| ref | returned handle for the given cred |

Description

Map from a cred, to a DFS Remote Attribute Interface handle. If a handle is found, then on return, ref will contain a pointer to the handle. Otherwise, ref will be zero upon return.

Return Value

A zero is always returned.

Notes 1.1.1.2 nfsdfsSysName

Purpose

Returns the @sys value for a given DFS Remote Attribute Interface handle

Syntax int nfsdfsSysName(struct dfsrai_handle *handle, char *namep)

Parameters

| | |
|---|---|
| handle handle | pointer to a DFS Remote Attribute Interface |
| namep | address of character array of size DFSRAI_MAXNAMELEN to place @ sys value |

Description

Return the value of the @sys path name for the given DFS Remote Attribute Interface handle.

Return Value

If successful, this routine returns zero. Otherwise a value of one is returned.

1.1.1.3 nfsdfsHostName

Purpose

Returns the @host value for a given DFS remote attribute interface handle

Syntax int nfsdfsHostName(struct dfsrai_handle *exp, char *namep)

Parameters

| | |
|---|---|
| handle handle | pointer to a DFS Remote Attribute Interface |
| namep | address of character array of size DFSRAI_MAXNAMELEN to place @ host value |

Description

Return the value of the @host path name for the given DFS Remote Attribute Interface handle.

Return Value

If successful, this routine returns zero. Otherwise a value of one is returned.

1.1.2 iau_load—The NFS server's link 1.1.2.1 iau_load

Purpose

Inserts a DFS PAG into a cred structure if an authentication mapping exists for the IP address and uid passed into the routine.

Syntax int iau_load(unsigned long iauthid, fsid_t *fsid, u_long addr, uid_t uid, struct ucred *cred, struct exporter **exi)

Parameters

| | |
|---|---|
| iauthid | iauth handle given to the NFS during the nfs_iauth_register( ) call |
| fsid | filesystem id portion of the NFS filehandle |
| addr | host IP address packed into an u_long (e.g. 219.35.100.2 is 0 x 81236402) |
| uid | user id |
| cred | credential to load PAG into |
| exi | currently not used |

Description

This is the routine which is registered with the NFS server to provide the mapping from the NFS request, identified by IP address, addr, and user id, uid, to a PAG, which is placed into the ucred structure passed into the routine. The routine uses the host and user id parameters to scan a hashed list describing the data maintained on behalf of the NFS clients (see the dfsiauth command). If the NFS client has associated a DFS principal with the NFS request, then the PAG will be inserted into the cred. If the user did not associate a DFS principal, but did associate a @sys, or @host value, the cred will be modified to indicate the address of the structure which contains the @sys and @host values.

Return Value

This routine always returns 0.

Notes

This function is internal to the intermediate authenticator component and should not be called directly. It is given abstractly to the NFS server via the nfs_register interface.

1.2 NFS Listener Interfaces 1.2.1 Intermediate Authenticator Registration Interfaces These interfaces are used by intermediate authenticators to provide their authentication mapping function.

1.2.1.1 nfs_iauth_register

Purpose

Registers a private handle and address of a function which the NFS Listener calls to associate an inbound NFS credential with DCE authentication information.

Syntax int nfs_iauth_register)unsigned long handle, int (*iauth_func)( ))

Parameters

| | |
|---|---|
| handle | A handle private to the intermediate authenticator which NFS should provide as one of the arguments on each call of iauth_func( ) |
| iauth_func | Address of intermediate authenticator functon to call |

Description

This service is called by an intermediate authenticator to register its function which evaluates incoming NFS credentials for transformation. For this design the intermediate authenticator component will call nfs_iauth_register( ) interface to register its iau_load( ) function. This will happen when the intermediate authenticator is configured. It has two parameters, the first is the handle, the second is the address of the routine to call, to associate the inbound request with a DCE principal.

When an NFS request arrives, the NFS listener will call the registered routine with several parameters. The first is the handle provided in the nfs_iauth_register( ). The second is the IP address of the request, encoded as a long. The third is the user id associated with the request. The fourth is a credential structure to return a PAG in. The last is a reference to the NFS export structure currently associated with the request. This parameter is not currently used. Below follows the syntax for this call.

crr=(*iauth_func (handle, long req_ip_address, long req_uid, struct ucred *cr, struct export * *exi);

Return Value

On successful completion a value of 0 is returned. Otherwise the following error is returned.

Error Codes

EEXIST An intermediate authenticator is already registered.

1.2.1.2 nfs_iauth_unregister

Purpose

Unregister the authentication function previously registered via nfs_iauth_register( ).

Syntax int nfs_iauth_unregister(char *name);

Parameters

| | |
|---|---|
| name | The name provides a desciption of the registered authenticator. It should be the same name that was provided in the nfs_iauth_register( ) call. |

Description

Removes the intermediate authenticator registration.

Return Value

This routine always returns 0.

1.3 DFS Remote Attribute Interface

The following procedures provide a registration interface for remote attribute managers. The DFS Cache manager checks the remote attribute interface when it encounters requests that did not originate from the machine the Cache Manager is running on. In the case of this design, this is requests from the NFS server.

1.3.1 Relevant Data Structures

The following structure descriptions and definitions are useful for discussing the DFS Remote Attribute Interface procedures.

```
struct dfsraiOps {
    int (*credToRaiHandle)();      /*find a handle for the cred */
    int (*sysName)();              /*get @sys value for the handle */
    int (*hostName)();             /*get @host value for the handle */
    int (*rele)();                 /*release the handle */
};
struct dfsrai_handle {
    struct dfsrai_handle *next         /*next in list */
    char mgrName [DFSRAI_MAXMGRNAMELEN + 1];
    /*descriptive name */
    struct dfsrai *ops;               /*the ops vector
*/
    int flags;                        /*flags */
};
*/
* Useful macros for calling the dfsrai operations.
*/
```

-continued

```
#define DFSRAI_SYSNAME(H, SYSNAME) (*((H)->ops->sysName))
(H,SYSNAME)
#define    DFSRAI_HOSTNAME(H,    HOSTNAME)    (*
((H)->ops->hostName))(H, HOSTNAME)
#define DFSRAI_RELE(H) (*((H)->ops->rele))(H)
```

1.3.2 Interfaces
1.3.2.1 dfsrai_register

Purpose

Register a new remote attribute manager

Syntax struct dfsrai_handle *dfsrai_register (char *name, struct dfsraiOps *ops, int flags)

Parameters

| | |
|---|---|
| name | name identifying remote attribute manager. A maximum of DFSRAI_MAXMGRNAMELEN characters is allowed. |
| ops | pointer to a dfsraiOps structure which contains pointers to the functions implemented by the remote attribute manager. |

Description

This routine creates a new dfsrai handle which represents the remote attribute manger. The handle is used internally by the DFS Remote Attribute Interface and represents the global set of operations for the remote attribute manager. The DFS Remote Attribute Interface uses the handle's credToRaiHandle( ) operation to obtain dfsrai handles for specific requests. The name is tested for uniqueness.

Return Value

If successful, the return value contains the address of the remote attribute manager's handle. On failure, a value of 0 is returned.

Notes

This is an exported interface meant for use by the intermediate authenticator component of the NFS/DFS Authenticating Translator.

1.3.2.2 dfsrai_unregister

Purpose

Removes the remote attribute manager specified by name

Syntax int dfsrai_unregister(char *name)

Parameters name name identifying remote attribute manager

Description

Remove the remote attribute manager indicated by name.

Return Value

If successful, this routine returns zero. Otherwise the following error is returned.

Error Codes

| | |
|---|---|
| ENOENT | The remote attribute manager indicated by name was not found. |

Notes

This is an exported kernel interface meant for use by the intermediate authenticator component of the NFS/DFS Translator.

1.3.2.3 dfsrai_credToRaiHandle

Purpose

Returns a DFS Remote Attribute Interface handle given a cred structure

Syntax struct dfsrai_handle *dfsrai_credToRaiHandle(struct ucred *cred);

Parameters

| | |
|---|---|
| cred | pointer to a credential structure |

Description

This returns a DFS Remote Attribute Interface handle which contains the operations for fetching the attributes for the given cred structure. It works by iterating through each of the registered remote attribute managers, and uses a procedure defined by each manager to attempt the mapping from the cred to a handle. When the caller is finished using the handle, the handle's rele( ) operation should be called.

Return Value

If successful, a pointer to a struct dfsrai_handle is returned. Otherwise, 0 is returned.

Notes

This function is internal to the DFS Remote Attribute Manager and is used by the DFS Cache Manager. The following code segment illustrates how the Cache Manager would use the interface.

```
static char *getsysname(rreqp, scp, cred, sysname)
    register struct cm_rrequest *rreqp;
    register struct cm_scache *scp;
    register struct ucred *cred;
    char *sysname;
{
    ...
    struct dfsrai_handle *handlep;
    char *name;
    if (handlep = dfsrai_credToRaiHandle(cred)) {
        print("getsysname: rai handle found, mgrname:%s/n",
        handlep->mgrName);
        DFSRAI_SYSNAME(handlep, name);
        DFSRAI_RELE(handlep);
    }
    return name;
}
```

2. System Calls

The following system call interfaces are intended for use only by the Translator commands and libraries. Therefore, they will not be documented in the Translator Programming Reference.

2.1 Relevant Data Structures

It is useful to document a couple of data structures here which are relevant to the iau_getentries( ) and iau_search( ) system calls.

```
/*
*External representations of iauth information. The iau_getentries(),
*and iau_search() system calls return these structures.
*/
struct iauthDesc {
unsigned long hostaddr;        /*ip addr pack in ulong */
uid_t userid;                  /*user id at NFS client */
};
struct iauthData {
unsigned long hostaddr;        /*ip addr packed in
                               ulong */
uid_t userid;                  /*user id at NFS
client */
unsigned long pag;                     /*assigned pag */
unsigned long exptime;          /*expiration time in
                               GMT */
unsigned long flags;                    /*entry flags */
char atsys[IAU_NAME_SIZE + 1];          /*@sys value for
                               entry */
```

```
char athost[IAU_NAME_SIZE + 1];        /*@host value for
entry */
char principalName[IAU_NAME_SIZE + 1]; /*DCE principal
name */
};
/*flags states for the iauthData struct */
#define IAUTH_DATA_ENTRY_EXPIRED 0 × 01 /*Entry's
DCE tkt is expired */
#define IAUTH_DATA_ENTRY_UNAUTHENTICATED 0 × 02
/*entry has null DCE principal */
```

2.2 System Call descriptions

2.2.1 iau_add

Purpose

Maps a host, uid pair and @sys and @host values to the PAG of the process

Syntax int iau_add(u_long addr, uid_t remoteuid, char *sysname, char *hostname, char *principal, int *pag);

Parameters

| | |
|---|---|
| addr | host IP address packed into an u_long (eg 129.35.100.2 is 0 × 81236402) |
| remoteuid | remote user id |
| sysname | name to use for @ sys path resolution |
| hostname | name ot use for @ host path resolution |
| principal | DCE principal name |
| pag | the PAG to associate this mapping with |

Description

The NFS client at IP address 'addr' will be mapped to the PAG of this process when 'remoteuid' is seen in the NFS request. This creates a mapping from <addr,uid> to the PAG of this process. The mapping actually maps from remote_host, remote_uid to a credential structure. A new credential structure is made to contain the existing PAG. If the current process re-authenticates (to a new PAG), it will have no effect on the recorded mapping. The process must already have a PAG (DFS identification) associated. The values passed in Description The PAG mapping for the NFS client at IP address addr, user, remoteuid, is removed.

Privilege Required

The caller must have local root user privilege to make this call.

Return Value

If successful, a value of 0 is returned. Otherwise a value of −1 is returned and errno is set to one of the following codes.

| | |
|---|---|
| EPERM | The caller did not have local root user privilege. |
| ENOENT | An entry does not exist for the host, uid pair. |
| EBUSY | The entry is currently in use and cannot be removed. |

2.2.3 iau_getentries

Purpose

Get all the registered authentication mappings from the intermediate authenticator.

Syntax int iau_getenties(char *bufp, int *bufLength, int *numEntries)

Parameters

| | |
|---|---|
| bufp | address of buffer to fill with authentication mapping entry descriptors. |
| bufLength | address of int containing length of buffer pointed to by bufp. |
| numEntries | address of int where count of number of entries loaded into bufp array is returned. | for the @sys and @host are also added to the mapping. The principal name is saved, but not interpreted.

Privilege Required

The caller must have local root user privilege to make this call.

Return Value

If successful, a value of 0 is returned. Otherwise a value of −1 is returned and errno is set to one of the following codes.

| | |
|---|---|
| EEXIST | An entry already exists for the host, uid pair. |
| EPERM | The caller did not have local root user privilege. |
| ENOMEM | Memory was not available to add the new entry. |
| EINVAL | The sysname, hostname or principal parameters were zero length or longer than IAU_NAMESIZE characters. |
| EFAULT | The addresses specified for the sysname, hostname, principal or pag parameters were invalid. |

2.2.2 iau_del

Purpose

Removes an intermediate authentication mapping between a host, uid pair and a DFS PAG Syntax int iau_del(u_long addr, uid_t remoteuid)

Parameters

| | |
|---|---|
| addr | host IP address |
| remoteuid | remote user id |

Description

This interface is used to retrieve a description of all of the current authentication mapping entries in the intermediate authenticator. An entry description consists of a hostaddr, uid pair. The entry descriptions are packed into the buffer pointed to by bufp. If the buffer is not large enough to hold all the entry descriptions, an errno of E2BIG is returned, and bufLength is set to indicate a buffer size that should hold all the entries. The caller should repeat the call with a larger buffer in this case. The minimum recommended array size is 1024 bytes. Once the array of entry descriptors is returned, the caller can retrieve the information for each entry by calling the iau_search( ) system call for each hostaddr, uid pair.

Privilege Required

The caller must have local root user privilege to make this call.

Return Value

If successful, a value of 0 is returned. Otherwise a value of −1 is returned and errno is set to one of the following codes.

Error Codes

| | |
|---|---|
| EPERM | The caller did not have local root user privilege. |
| E2BIG | The buffer pointed to by bufp was not large enough to hold all the entries. |

-continued

| | |
|---|---|
| EFAULT | Indicates that the address specified for bufp, bufLength, or numEntries was invalid. |

2.2.4 iau_search
Purpose
Search for an authentication mapping given a host, uid pair.
Syntax
int iau_search(u_long addr, uid_t remoteuid, struct iauthData *entryInfo)
Parameters

| | |
|---|---|
| addr | host IP address |
| remoteuid | remote user id |
| entryInfo | address to fill with authentication mapping information |

Description
Search for an authentication mapping with the input address, uid pair. If an entry is found, the entryInfo structure is filled in with the authentication mapping information. Note that the exptime member of the entryInfo is only valid if the flags indicate the entry is authenticated and is not expired.
Privilege Required
The caller must have local root user privilege to make this call.
Return Value
If successful, a value of 0 is returned. Otherwise a value of −1 is returned and errno is set to one of the following codes.
Error Codes

| | |
|---|---|
| EPERM | The caller did not have local root user privilege. |
| ENOENT | No such entry exists. |
| EFAULT | Indicates that the address specified for entryInfo was invalid. |

2.2.5 iau_flush
Purpose
Flush authentication mappings from the intermediate authenticator
Syntax
int iau_flush(int flushall)
Parameters

| | |
|---|---|
| flushall | if non-zero, then flush all entries |

Description
iau_flush purges authentication mappings. If flush all is non-zero, then all entries which are not currently being referenced are purged. If flush all is 0 then only un-authenticated entries and entries which have expired DCE tickets are removed.
Privilege Required
The caller must have local root user privilege to make this call.
Return Value
If successful, a value of 0 is returned. Otherwise a value of −1 is returned and err no is set to one of the following codes.
Error Codes
EPERM The caller did not have local root user privilege.
2.3 System call Issues The system calls use a u_long to identify the remote ip address of the client. This is not completely correct, and should be expanded to become sin_addr, to allow integration into any new strategy to deal with the shrinking IP address space. This will be allowed for now since the affected interfaces are internal to the Translator component.

3. Commands
3.1 dfsiauth
Purpose
Performs operations against the Translator to authenticate a DCE principal, register, unregister, or list host/uid pairs for translation and optionally associate @sys and @host values for path substitution
Synopsis
dfsiauth -add [-overwrite] |-delete -r remote_host -i remote_uid [-u principal] [-p password] [-s sysname] [-h hostname]
dfsiauth -list [-u principal] [-p password] |-flush
Options

| | |
|---|---|
| -r remote_host | hostname of the NFS client system requesting authenticated access |
| -i remote_uid | uid of the NFS client user requesting authenticated access |
| -u principal | DCE principal to authenticate as |
| -p password | password of the DCE principal |
| -s sysname | associate parameter sysname with the @sys property for the input host/uid pair |
| -h hostname | associate parameter hostname with the @host property for the input host/uid pair |
| -add | add the specified mapping information |
| -delete | delete the specified mapping information |
| -overwrite | change information about an existing mapping, option only valid with the -add option |
| -list | list the registered authentication mappings |
| -flush | remove expired and unauthenticated mappings |

Description
The dfsiauth command performs operations against the Translator for a remote host, and remote uid, with an existing DCE principal. It is issued on the machine which performs NFS/DFS translation. The DCE principal's password must be included. The password can be included on the command line (-p password). When the password is not included, the command will prompt for the password.

The options for -add, -delete, etc. may be abbreviated on the command line to -a, -d, etc. or any other shortened form of the option.

The -add option is used to register a hostname, uid pair to a DCE principal. Along with performing an association for NFS service, the command can also be used to associate an @sys and @host name for path element substitution. If a principal is not specified, an unauthenticated mapping is assumed and only @sys and @host values are registered. No attempt is made to validate the selected values of @sys and @host.

The -overwrite option is only used with the -add option to overwrite an existing authentication mapping. This option may be useful if the @sys value needs to be changed due to a software upgrade, for example. In order to overwrite existing information, the principal that initially set up the mapping must also be given as the principal requesting to overwrite the information.

The -delete option is used to remove an authentication mapping from the Translator. The principal that added the mapping must be the same as the principal who is attempting to delete the mapping. This information is checked before the decision is attempted. If the principals do not match, an error is returned. The principal is not checked when attempting to remove unauthenticated mappings (i.e. @sys and @host mappings).

The -list option will display the hostname, uid pairs that are registered with the Translator. A user must provide his/her DCE principal and password before his/her registered mappings can be displayed. Only the user's mappings are displayed. The local root user may issue this command without a DCE principal and password to view all mappings registered with the Translator. The mapping information fields which are displayed may be truncated in order to display the output within the screen format. The -list option will also indicate the time when a mapping is set to expire, if it has already expired or if it is unauthenticated.

The Translator periodically performs automatic reclaimation of expired mappings. However, the dfsiauth -flush option may also be used to manually remove all expired and unauthenticated authentication mappings from the Translator. Only the local root use may issue this command.

Privilege Required

This program runs as a setuid program. Issuer must be the local root user in order to execute the -flush option.

EXAMPLES

The following command authenticates to DCE as the principal, dawn, and registers the remote host, sunlight, and remote uid, 1065. The sysname, rs_aix32, is also associated with this authentication mapping.

```
$ dfsiauth -add -r sunlight -i 1065 -u dawn -p -dce- -s rs_aix32
    dfsiauth: <sunlight, 1065> mapping added
    DCE principal: dawn
    System Type (@sys) rs_aix32
```

The following example shows the authentication mapping for remote host, spooky.austin.ibm.com, and uid, 654 where the command prompts for the password.

```
$ dfsiauth -add -r spooky.austin.ibm.com -i 654 -u ghost
Password: boo
    dfsiauth: <spooky.austin.ibm.com, 654> mapping added
    DCE principal: ghost
```

This example shows setting the @sys value, intel_os2, and @host value, mystic, to be associated with the remote host, mystic, and remote uid, 1022. This mapping sets up @sys and @host values for an unauthenticated DFS user.

```
$ dfsiauth -add -r mystic -i 1022 -s intel_os2 -h mystic
    dfsiauth: <mystic, 1022> mapping added
    System Type (@sys) intel_os2, Host Type (@host) mystic
```

This example overwrites the existing mapping of remote host, sunlight, remote uid, 1065, by changing the current rs_aix32 @sys value with the new value, sun. This mapping was previously registered using the DCE principal, dawn.

```
$ dfsiauth -add -overwrite -r sunlight -i 1065 -u dawn -p -dce- -s sun
    dfsiauth: <sunlight,1065> mapping changed
    DCE principal: dawn
    System Type (@sys) sun
```

The following shows deletion of the authentication mapping for the remote host, spooky.austin.ibm.com, and remote uid, 678, associated with DCE principal, ghost.

```
$ dfsiauth -delete -r spooky.austin.ibm.com -i 678 -u ghost -p boo
    dfsiauth: <spooky.austin.ibm.com, 678> mapping deleted
    DCE principal: ghost
```

The following example shows listing the registered authentication mappings. The user is logged in as the local root user.

```
#dfsiauth -list
Host              Uid     Principal  @sys   @host   Expiration
sunlight.austin.ibm 1065            dawn   sun     2/27/95 12:00:45
mystic            1022    -          intel_os2  mystic
[Unauthenticated]
```

The following example shows listing the registered authentication mappings. The user is logged in as the local root user.

```
$dfsiauth -list -u dawn -p -dce-
Host              Uid     Principal  @sys   @host   Expiration
sunlight.austin.ibm 1065            dawn   sun     2/27/95 12:00:45
```

4. libdceiauth.a Library API

The following user-level API is available to authenticate a host, id pair to a DCE principal and perform operations such as adding and deleting mappings. This will allow applications to make use of Translator authentication function such as a remote login tool. This API is available in the libdceiauth.a library.

4.1 dceiauthcall

Purpose

Authenticates a DCE principal and performs operations against the Translator to register or unregister a host/uid pair for translation and associate @sys and @host values for path substitution Syntax

```
#include <dcedfs/dceiauthapps.h>
int dceiauthcall (char *remoteHost, char *remoteUid, char *user,
    char * passwd, char *sys,char *host,int *pag,int flags,char *buffer,
    int buflen)
```

Parameters

Input remoteHost hostname of the system requesting authenticated access

| | |
|---|---|
| remoteUid | remote user id |
| user | DCE principal to authenticate as |
| passwd | password of the DCE principal in the DCE registry |
| sys | value to be used for @sys pathname substitutions |
| host | value to be used for @host pathname substitutions |
| flags | specifies which operation to perform against the Translator. Valid flags are listed below. The parameter value is constructed by logically ORing the specified flags |

Output

| | |
|---|---|
| pag | pag id that has been registered in the call |
| buffer | buffer to return query information in. This is unsupported at this time |

Input/Output

| | |
|---|---|
| buflen | length of buffer being passed in. This is unsupported at this time |

Flags

| | |
|---|---|
| IAUTH_ADD | Add the authentication mapping specified |
| IAUTH_DELETE | Remove the authentication mapping from the Translator |
| IAUTH_OVERWRITE | Overwrite an existing mapping with new information. This flag has no effect if specified with the IAUTH_DELETE flag |

Description

The dceiauthcall is used by applications to perform operations against the Translator. The supported operations allow remote host/remote uid pairs to be registered or unregistered to an existing DCE principal. Values for @sys and @host substitution may also be passed in as parameters. This API calls the proper DCE security routines to verify the authentication and obtain a PAG before making the appropriate iau_add or iau_delete system call to perform the operation. The overwrite flag, IAUTH_OVERWRITE, may be used with the IAUTH_ADD flag to change information about an existing authentication mapping. If the IAUTH_OVERWRITE is used with a non-existent entry, IAUTH_OVERWRITE is ignored and the entry is added.

Return Value

On success, zero is returned. If the call fails, a negative value is returned, and the errno variable is set as follows:

Error Codes

| | |
|---|---|
| EPERM | The caller did not have super user privilege or attempted to remove an entry other than its own |
| EEXIST | The entry already exists. The IAUTH_OVERWRITE flag should be used to overwrite an existing entry |
| ENOMEM | Memory was not available to add the new entry |
| EINVAL | An invalid parameter was passed into the call |
| ENOENT | The entry does not exist for the host, uid pair |
| EBUSY | The entry is currently in use and cannot be removed. |

The following describes in detail user-level code changes needed to perform translator system administration. A command with a suite of options is implemented for this purpose. This is accessed by logging into the DFS client machine running the translator either locally or via remote login facility (telnet, rlogin) to manage the intermediate authentication mappings. This command performs the following functions—authenticate a DCE principal to be associated with an NFS host/id pair, register NFS/DFS authentication mappings with the translator, query registered intermediate authentication mappings, and remove intermediate authentication mappings from the translator. In addition, expired mappings are removed from the translator periodically. The command to perform these functions is called dfsiauth.

The ability to intermediate authenticate a DCE principal to an NFS host/id pair is acheived through the use of the -add option of the dfsiauth command. In addition to registering the remote host and remote uid, this command also associates @sys and @host names for path lookup resolution.

If a user wishes to change a registered intermediate authentication mapping, an overwrite (-overwrite) option is included in dfsiauth. This option should be given with the -add option to change existing information about a mapping. This is useful for changing the @sys value when software upgrades occur, for example.

Once authentication mappings have been established, the -list option of the dfsiauth command may be used to query which mappings currently exist on the translator machine. This command displays a list of host address, id pair to DCE principal mappings. For security purposes, only the local root user will be able to display all the mappings. If a user provides a DCE principal and password to the dfsiauth -list command, the mappings for that DCE principal will be displayed.

Removal of intermediate authentication mappings is accomplished through the dfsiauth command with the -delete option. This command deletes a previous mapping from the translator.

The local root user has the ability to remove expired and unauthenticated intermediate authentication mappings periodically by using the dfsiauth -flush command. Translator users whose mappings have expired use the dfsiauth -add command to re-authenticate to the translator. Preferably, the user is not notified when his/her mapping has expired.

In a DCE environment, a user (principal) can determine when his/her DCE credentials will expire by using a klist command. This function depends on the fact a DCE-authenticated process currently exists that can be associated with the DCE credentials (this holds true for kinit and kdestroy as well). This will not work in the NFS/DFS translator model because there is not a running process on the translator system which DCE credentials can be associated with to perform the klist. Therefore, a translator user cannot list his credential information.

When DCE credentials expire, the translator user will not be able to use the kinit command to renew his credentials. From the user's point of view, when his/her DCE credentials expire, it will appear as if he is doing filesystem operations as an unauthenticated DCE user. To become DCE authenticated again, the user must use the translator registration command to reregister the mapping. At this time, the mapping will be authenticated once again.

Another implementation issue is protecting the DCE principal's password securely from the NFS client to the translator machine. Since many of the networks used by NFS clients provide some form of promiscuous listening, shipping clear-text data packets to a daemon from a client would compromise security. The best possible solution is to use some proxy authentication scheme with a session key established between the NFS client and the NFS/DFS translator. Other ad-hoc encryption mechanisms are also possible if a proxy authentication is difficult to build. Such ad-hoc mechanisms are less secure, but common NFS offers poor security mechanisms. It is straightforward to compromise NFS security with forged requests, complete with fake IP, and fake uid values. A forged packet would allow any user to use a NFS/DFS registered PAG through the NFS/DFS translator. Since the common NFS clients would be operating with little security, it does not necessarily make sense to invest significant effort in the development of proxy authentication mechanisms. It is desirable to avoid providing a complex solution for the NFS client as a goal of this design is to minimize software impacts to the NFS client.

Due to this array of choices, as noted above this design provides the local tools on the NFS translator machine and provides an API layer to which client/server management tools may be written. With this approach, a client/server tool set may be written to satisfy the needs of the customer environment.

One of the preferred implementations of the authentication translator and associated routines is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred in a specific operating system and network environment (OSF DCE), those skilled in the art will recognize that the invention can be practiced, with modification, in other and different operating systems and network architectures within the spirit and scope of the appended claims. The invention is not to be construed as limited to the OSF DCE architecture and thus in a more general sense the invention should be broadly construed to cover any network environment in which it is desired to have multiple distributed file systems coexist and interoperate. In addition, the term "credential" should be broadly construed to refer to any data structure used to identify a particular user of a single user or multiuser machine, and an enhanced credential shall likewise be broadly construed to any variant or modification of the underlying credential to thereby facilitate the filesystem request. Further, although in the preferred embodiment a PAG is created from a remote IP address and user id, one skilled in the art will recognize that the PAG may be created from other information describing the source distributed file system authentication model. Thus, if the source distributed file system is AFS, such information may constitute the AFS authentication ticket.

Having thus described our invention, what we claim as new and desire to secure by letters patent is set forth in the following claims.

What is claimed is:

1. A method for providing authenticated access to files stored in a target distributed file system in response to a file request originating from a client associated with a source distributed file system, each of the distributed file systems having at least one client and one server associated therewith, comprising the steps of:

mapping a credential associated with the file request to the source distributed file system into an enhanced credential containing authentication information that establishes a principal's authentication for accessing the target distributed file system;

determining whether there is any additional attribute pertaining to the file request, the attribute associated with a variable that defines information for use in processing the file request; and if there is any additional attribute, retrieving the variable associated therewith and using the enhanced credential and the information to carry out the file request.

2. The method as described in claim 1 wherein the target distributed file system is Open Systems Foundation (OSF) Distributed Computing Environment (DCE) Distributed File Services (DFS).

3. The method as described in claim 2 wherein the source distributed file system is a Network File System (NFS).

4. The method as described in claim 1 wherein users of the source distributed file system are not authenticated with respect to the target distributed file system.

5. The method as described in claim 1 wherein the file request originating from the client associated with a source distributed file system includes an internet protocol (ip) address and user identifier (uid) pair.

6. The method as described in claim 5 wherein the enhanced credential includes an authentication tag derived from the internet protocol (ip) address and user identifier (uid) pair.

7. In a distributed computing environment including a source computer system and a target computer system, each of which has at least one client, one server and a distributed file system, and wherein the server associated with the source computer system runs on a client of the target computer system, a method for providing authenticated access to files stored in the target distributed file system in response to file requests originating from clients associated with the source distributed file system, comprising the steps of:

mapping credentials associated with incoming client requests from the source distributed file system into enhanced credential, an enhanced credential containing authentication information that establishes a principal's authentication for accessing the target distributed file system;

augmenting at least one enhanced credential with an attribute associated with a variable that defines a path to the server of the target distributed file system; and having the source computer system's server make file system requests using the enhanced credentials so that each file request appears to the target computer client as if it were made by an authenticated process.

8. The method as described in claim 7 wherein the target distributed file system is Open Systems Foundation (OSF) Distributed Computing Environment (DCE) Distributed File Services (DFS).

9. The method as described in claim 8 wherein the users of the source distributed file system are not authenticated with respect to the target distributed file system.

10. The method as described in claim 7 wherein a file request originating from the client associated with the source distributed file system includes an internet protocol (ip) address and user identifier (uid) pair.

11. The method as described in claim 10 wherein the enhanced credential includes an authentication tag derived from the internet protocol (ip) address and user identifier (uid) pair.

12. In a distributed computing environment including a Network File System (NFS) client, an NFS server and a NFS distributed file system, and a Distributed File Services (DFS) client, a DFS server and a DFS distributed file system, wherein the NFS server runs on the DFS client, a method for managing NFS file requests to the DFS distributed file system, comprising the steps of:

maintaining a set of NFS to DFS mappings in an authenticator;

intercepting incoming NFS client requests destined for the DFS client;

calling the authenticator to transform at least one NFS credential into a transformed NFS credential that contains authentication information necessary for authenticated DFS access; and having the NFS server make a file system request to the DFS distributed file system using the transformed NFS credential so that file request appears to the DFS client as if it were made by an authenticated process.

13. The method as described in claim 12 wherein the NFS server makes the file system request through the DFS client's virtual filesystem switch (VFS).

14. The method as described in claim 12 wherein the NFS credential is transformed by including a Process Authentication Group (PAG) code.

15. In a distributed computing environment including a source computer system and a target computer system, each of which has at least one client, once server an a distributed file system, and wherein the server associated with the source computer systems runs on a client of the target computer system, a method for providing authenticated access to files stored in the target distributed file system in response to file requests originating from clients associated with the source distributed file system, comprising the steps of:

using an authenticating translator to map a credential associated with an incoming client request from a source distributed file system into an enhanced credential, the enhanced credential including authentication information that establishes a principal's authentication for accessing the target distributed file system;

determining whether the authenticating translator stores additional attributes for the enhanced credential; and if the authenticating translator stores additional attributes for the enhanced credential, providing at least one method back to the client to enable the client to obtain values associated with those attributes.

16. In a distributed computing environment including a source computer system and a target computer system, each of which has at least one client, at least one server and one or more distributed file systems, and wherein the server associated with the source computer system runs on a client of the target computer system, the improvement comprising:

authenticator means including first and second remote attribute managers each having a set of source to target file system mappings, wherein the first remote attribute manager is associated with a first distributed file system and wherein the second remote attribute manager is associated with a second distributed file system;

a remote attribute interface located between the client of the target computer system and the authenticator means, wherein the first and second remote attribute managers are registered with the remote attribute interface; and means responsive to a file request originating from a client of the source computer system for passing a handle from the authentication means through the remote attribute interface to the client of the target computer system, wherein the handle defines at least operation that is called to obtain additional information for use in completing the file request.

17. In the distributed computing environment as described in claim 16 wherein the additional information includes one or more attributes whose values are extracted and used in the processing of the file request.

18. A computer system, comprising:

a client associated with a target distributed file system;

a server running on the client, the server associated with a source distributed file system; and means for managing source distributed file system requests to the target distributed file system, comprising:

means for maintaining a set of mappings from the source distributed files system to the target distributed file system;

means for intercepting incoming file requests destined for the client associated with the target distributed file system;

means responsive to the intercepting means for transforming at least one source distributed file system credential to include authentication information necessary for authenticated access to the target distributed file system; and means for controlling the server associated with the source distributed file system to make a file system request using the transformed credential.

19. The computer system as described in claim 18 wherein the means for managing further includes means for augmenting the transformed credential with at least one attribute.

20. The computer system as described in claim 19 wherein the means for augmenting includes a remote attribute interface.

21. A computer product in computer-readable media for managing file system requests from a source distributed file system to a target distributed file system, comprising:

means for maintaining a set of mappings from the source distributed file system to the target distributed file system;

means for intercepting incoming file requests destined for the target distributed file system;

means responsive to the intercepting means for transforming at least one credential associated with a file request originating with the source distributed file system to include authentication information necessary for authenticated access to the target distributed file system; and means for augmenting the transformed credential with at least one attribute.

* * * * *

UNITED STATES PATENT AND TRADEMARK OFFICE
CERTIFICATE OF CORRECTION

PATENT NO.   : 6,006,018
DATED        : December 21, 1999
INVENTOR(S)  : Burnett et al.

It is certified that error appears in the above-identified patent and that said Letters Patent is hereby corrected as shown below:

Column 11,
Line 19, please delete "219.35.100.2" substitute therefor -- 1219.35.100.2 --;

Column 13,
Below line 21, and above the solid black line insert -- flags      currently ignored --;

Column 15,
Line 42, after "passed in" please insert -- for the @sys and @host are also added to the mapping. the principal name is saved, but not interpreted.

*Privilege Required*

The caller must have local root user privilege to make this call.

*Return Value*

If successful, a value of 0 is returned. Otherwise a value of –1 is returned and errno is set to one of the following codes.

| | |
|---|---|
| EEXIST | An entry already exists for the host, uid pair. |
| EPERM | The caller did not have local root user privilege. |
| ENOMEM | Memory was not available to add the new entry. |
| EINVAL | The sysname, hostname or principal parameters were zero length or longer than IAU_NAMESIZE characters. |

2.2.2 iau_del

*Purpose*

Removes an intermediate authentication mapping between a host, uid pair and a DFS PAG

*Syntax* int iau_del(u_long addr, uid_t remoteuid)

UNITED STATES PATENT AND TRADEMARK OFFICE
CERTIFICATE OF CORRECTION

PATENT NO. : 6,006,018
DATED : December 21, 1999
INVENTOR(S) : Burnett et al.

It is certified that error appears in the above-identified patent and that said Letters Patent is hereby corrected as shown below:

*Parameters* addr        host IP address remoteuid remote user id --;

Column 16,
Line 10, please delete lines 10-39;

Column 24,
Line 28, please delete the first occurrence of "credential," and substitue therefor -- credentials, --

Signed and Sealed this

Twelfth Day of March, 2002

Attest:

JAMES E. ROGAN
*Attesting Officer*    *Director of the United States Patent and Trademark Office*